United States Patent
Pirzada et al.

(10) Patent No.: US 9,449,633 B1
(45) Date of Patent: Sep. 20, 2016

(54) SMOOTH STRUCTURES FOR HEAT-ASSISTED MAGNETIC RECORDING MEDIA

(71) Applicant: WD Media, LLC, San Jose, CA (US)

(72) Inventors: Shahid Pirzada, Fremont, CA (US); Tomoko Seki, Sunnyvale, CA (US); B. Ramamurthy Acharya, Fremont, CA (US); Antony Ajan, Santa Clara, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/535,130

(22) Filed: Nov. 6, 2014

(51) Int. Cl.
| | |
|---|---|
| G11B 11/00 | (2006.01) |
| G11B 5/84 | (2006.01) |
| G11B 5/64 | (2006.01) |
| G11B 5/73 | (2006.01) |
| G11B 5/48 | (2006.01) |
| G11B 5/00 | (2006.01) |
| G11B 5/31 | (2006.01) |
| G11B 11/105 | (2006.01) |

(52) U.S. Cl.
CPC ............... *G11B 5/84* (2013.01); *G11B 5/4866* (2013.01); *G11B 5/647* (2013.01); *G11B 5/732* (2013.01); *G11B 5/314* (2013.01); *G11B 11/10584* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,227,211 A | 7/1993 | Eltoukhy et al. | |
| 5,567,512 A | 10/1996 | Chen et al. | |
| 5,705,287 A | 1/1998 | Doerner et al. | |
| 5,714,044 A | 2/1998 | Lal et al. | |
| 5,772,856 A * | 6/1998 | Kawase et al. | 204/192.2 |
| 5,855,746 A | 1/1999 | Prabhakara et al. | |
| 5,858,182 A | 1/1999 | Horng et al. | |
| 5,943,187 A | 8/1999 | Chen et al. | |
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |

(Continued)

OTHER PUBLICATIONS

Yang Yun, et al., U.S. Appl. No. 13/539,103, filed Jun. 29, 2012 14 pages.

*Primary Examiner* — Tan X Dinh
(74) *Attorney, Agent, or Firm* — John D. Henkhaus (57) ABSTRACT

A recording medium having improved signal-to-noise ratio (SNR) capabilities and head-disk interface characteristics includes an etched smoothened underlayer, over which the recording layer is grown. One mechanism for increasing the SNR is by growing more columnar magnetic grain structures within the recording layer, which is facilitated by a smoother underlayer template.

22 Claims, 4 Drawing Sheets

(56) References Cited

U.S. PATENT DOCUMENTS

| | | |
|---|---|---|
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,524,687 B2 | 2/2003 | Horng et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,602,620 B1 * | 8/2003 | Kikitsu et al. ............ 428/842.2 |
| 6,613,422 B1 | 9/2003 | Ma et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,018,729 B2 | 3/2006 | Pocker et al. |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,153,441 B2 | 12/2006 | Ishibashi et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,169,488 B2 | 1/2007 | Chen et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B2 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,377,025 B2 | 5/2008 | Zhao et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,950,136 B2 | 5/2011 | Zhao et al. |
| 7,955,723 B2 | 6/2011 | Umezawa et al. |
| 7,961,427 B2 | 6/2011 | Dorbeck et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |

(56) References Cited

U.S. PATENT DOCUMENTS

| | | |
|---|---|---|
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,721,903 B2 | 5/2014 | Bian et al. |
| 8,740,671 B2 | 6/2014 | Saito et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 8,900,465 B1 | 12/2014 | Yun et al. |
| 2001/0031382 A1 | 10/2001 | Kusakawa et al. |
| 2002/0060883 A1 | 5/2002 | Suzuki |
| 2002/0063108 A1* | 5/2002 | Wang ............... G11B 5/84 216/22 |
| 2002/0186506 A1* | 12/2002 | Sato et al. ............. 360/135 |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0208341 A1 | 9/2005 | Morikawa et al. |
| 2005/0263401 A1 | 12/2005 | Olsen et al. |
| 2006/0121318 A1* | 6/2006 | Gage et al. ............. 428/827 |
| 2006/0147758 A1 | 7/2006 | Jung et al. |
| 2006/0181697 A1 | 8/2006 | Treves et al. |
| 2006/0207890 A1 | 9/2006 | Staud |
| 2006/0218774 A1* | 10/2006 | Carey ............... B82Y 10/00 29/603.13 |
| 2006/0222112 A1* | 10/2006 | Carey ............... B82Y 25/00 375/341 |
| 2007/0070549 A1 | 3/2007 | Suzuki et al. |
| 2007/0187227 A1* | 8/2007 | Marinero ............. 204/192.2 |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0032643 A1 | 2/2010 | Xu |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0012554 A1 | 1/2012 | Bian et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |

(56) References Cited

U.S. PATENT DOCUMENTS

| | | |
|---|---|---|
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0264306 A1 | 10/2013 | Bian et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0057446 A1 | 2/2014 | Yu et al. |
| 2014/0151360 A1 | 6/2014 | Gregory et al. |
| 2014/0217060 A1* | 8/2014 | Mao et al. ............ 216/22 |
| 2014/0234666 A1 | 8/2014 | Knigge et al. |
| 2015/0016774 A1* | 1/2015 | Ju et al. ............ 385/15 |

\* cited by examiner

SMOOTH STRUCTURES FOR HEAT-ASSISTED MAGNETIC RECORDING MEDIA

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the oil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) is a technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature near the Curie temperature, at which the medium effectively loses coercivity and a realistically achievable magnetic write field can write data to the medium.

In order to improve the recording performance for media, including HAMR media, it is desirable to increase the SNR (Signal-to-Noise Ratio) through structure design and materials selections.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a recording medium having an etched underlayer under the magnetic recording layer are described. In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Physical Description of Illustrative Operating Environments

Embodiments may be used in the context of a heat-assisted magnetic recording (HAMR) medium in a hard-disk drive (HDD) data storage device. Thus, in accordance with an embodiment, a plan view illustrating an HDD 100 is shown in FIG. 1 to illustrate an exemplary operating environment.

Figure 1:
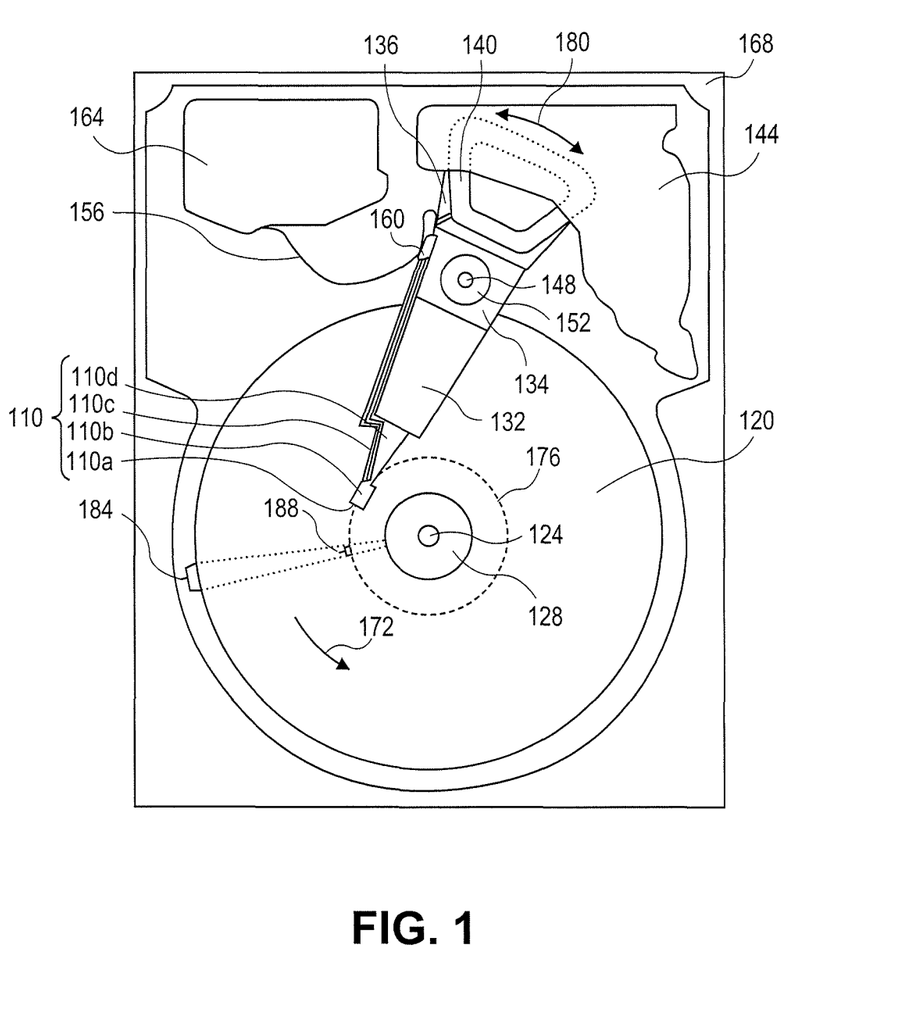
FIG. 1 is a plan view illustrating a hard disk drive, according to an embodiment.

FIG. 1 illustrates the functional arrangement of components of the HDD 100 including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one magnetic-recording medium 120 rotatably mounted on a spindle 124 and a drive motor (not visible) attached to the spindle 124 for rotating the medium 120. The head 110*a* includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

Heat-assisted magnetic recording (HAMR) technology that utilizes $L1_0$ FePt based alloys has been investigated for use in hard disk drive media, with a belief that an areal density over 1.5 Tb/in$^2$ may be achievable. As mentioned, increasing the SNR of media, including HAMR media, improves the recording performance. One approach to a media structure for HAMR applications comprises an adhesive layer, heat sink, underlayer, magnetic recording layer and a protective layer/overcoat. Reference herein to a "layer" is not intended to be thereby limited to a single layer, rather each "layer" referenced may actually comprise multiple layers, or a "stack" of thin film layers. To improve the recording performance of HAMR media, particularly media SNR, media structure design and material selection is an area of interest.

The underlayer is used to grow proper crystallographic structures in the magnetic recording layer stack. Deposition of the HAMR stack utilizes high temperatures to get desired crystallographic structures. However, high temperatures induce higher roughness in the medium. High roughness in medium could be detrimental for the head-disk interface reliability, by excessively wearing the head and possibly leading to a drive failure. Further, a substantially thick heat sink layer is typically used to achieve a high thermal gradient, which is desirable for HAMR stack design. However, a thicker heat sink layer generates stress, which leads to a rougher underlayer. High roughness may further result in corrosion susceptibility of the media, possibly leading to the drive failure. Note also that there is a limitation on the thickness of the protective layer on top of the media due to the corresponding spacing loss.

Etched Underlayer for Recording Media

One approach to increasing SNR and improving the head-disk interface (HDI) reliability is to reduce the roughness in the medium. Therefore, embodiments involve an etching process to reduce the surface roughness (e.g., $R_a$ and $R_p$) of the HAMR media stack.

Figure 2:
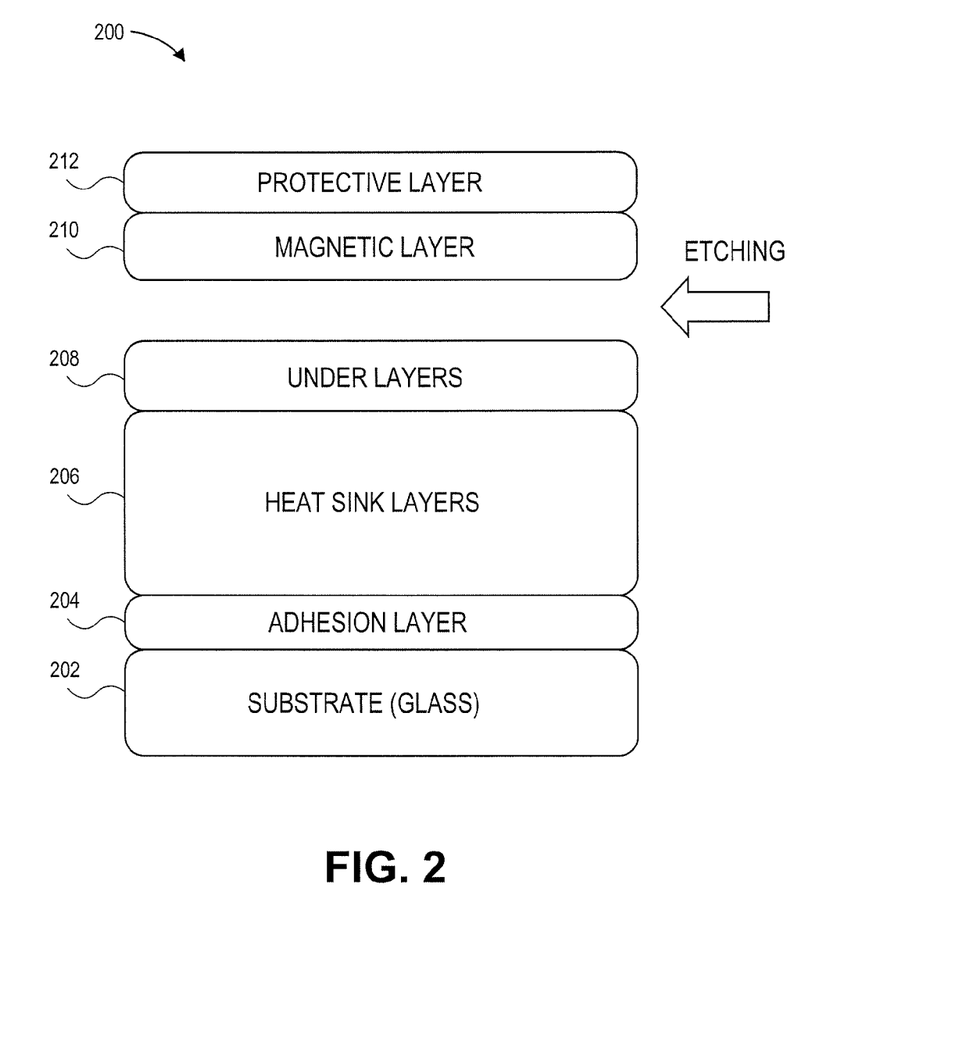
FIG. 2 illustrates a heat-assisted magnetic recording medium (HAMR) stack having an etched underlayer, according to an embodiment.

FIG. 2 illustrates a heat-assisted magnetic recording medium (HAMR) stack having an etched underlayer, according to an embodiment. The medium 200 includes a stacked structure with a bottom substrate 202, an adhesion layer 204 over or on the substrate 202, heat sink layers 206 over or on the adhesion layer 204, underlayers 208 over or on the heat sink layers 206, a magnetic recording layer 210 grown over or on the underlayers 208, and an overcoat layer 212 over or on the magnetic recording layer 210.

Moving down the HAMR stack, $L1_0$ FePt, which has high magnetic anisotropy, is a desirable material for the magnetic recording layer 210 in a HAMR stack such as medium 200. Other magnetic materials such as CoPt, $SmCo_x$, NdFeB, for non-limiting examples, are also suitable for and thus may be used for the magnetic recording layer 210. Appropriate non-magnetic segregants are added to FePt to isolate the magnetic grains to minimize the exchange coupling. There is an extensive list of potential segregants which could be used to isolate the magnetic grains, such as C, B, Ag, Au, $SiO_2$, $TiO_2$, $Ta_2O_5$, $WO_3$, $Al_2O_3$, $Cr_2O_3$, $ZrO_2$, $Y_2O_3$, $Nb_2O_5$, $CrC_x$, $SiN_x$, BN, $ZrB_2$, $TiB_2$, for non-limiting examples. The segregant should be non-magnetic and immiscible to FePt, thermally stable and have appropriate surface energy to isolate the FePt grains.

An appropriate underlayer 208 such as MgO, VN, CrN, TiN, CrMo, for non-limiting examples, may be used to grow a proper crystallographic structure of $L1_0$ FePt magnetic recording layer 210. High temperature is utilized to obtain ordered $L1_0$ FePt structure. That is, because FePt deposited using sputtering at ambient temperature results into chemically disordered face-centered cubic (fcc) phase (A1), high temperature is utilized to obtain an ordered L1$_0$ FePt structure for magnetic recording layer 210. Furthermore, use of high temperature during deposition is considered more effective than post deposition annealing to obtain ordering of FePt.

A HAMR stack such as medium 200 may utilize a thick heat sink layer 206 such as W, Ru, Cu, for non-limiting examples, to achieve high thermal gradient in the stack, where the thermal gradient is desirable in order to have a steep write field gradient. NiTa or CrTa, for non-limiting examples, may be used as adhesion layer 204, and a high temperature glass substrate 202 is suitable for growing the foregoing structures.

The deposition of layers can be performed using a variety of deposition sub-processes, for non-limiting examples, physical vapor deposition (PVD), sputter deposition and ion beam deposition, and chemical vapor deposition (CVD) including plasma enhanced chemical vapor deposition (PECVD), low pressure chemical vapor deposition (LP-CVD) and atomic layer chemical vapor deposition (AL-CVD). Furthermore, other suitable deposition techniques known in the art may also be used.

According to an embodiment, underlayer 208 is etched to smooth the underlayer 208, as depicted in FIG. 2. A smoother, or less rough, underlayer 208 provides a better template for growth of the crystallographic structures in the magnetic recording layer 210. According to an embodiment, the underlayer 208 is physically etched, as opposed to chemically etched, which is considered practical yet effective in a high-volume hard disk production environment.

Method of Manufacturing Recording Media

Figure 3:
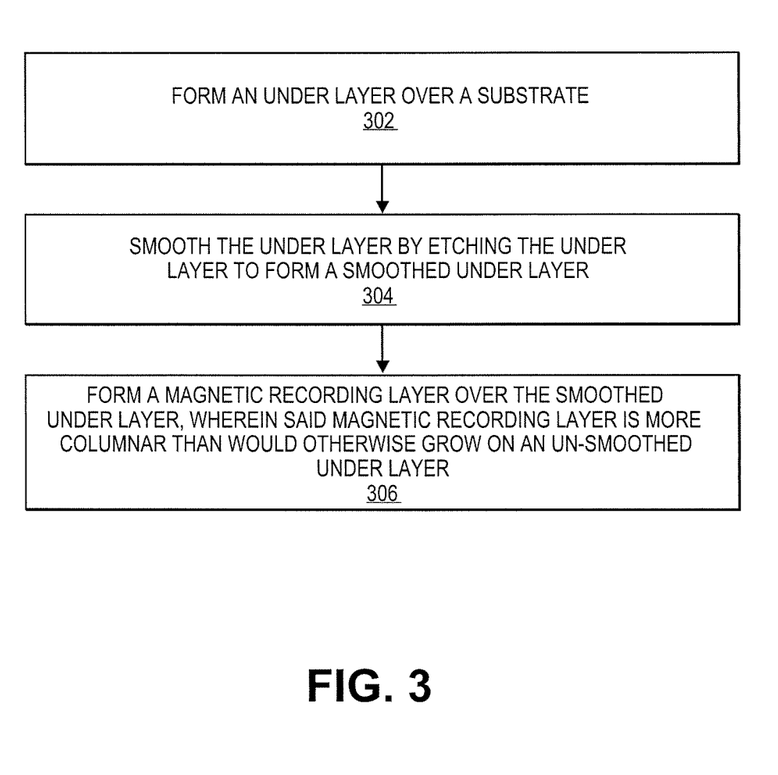
FIG. 3 is a flow diagram illustrating a method of manufacturing a recording medium, according to an embodiment.

Embodiments may be implemented in a HAMR hard disk drive including such HAMR media. FIG. 3 is a flow diagram illustrating a method of manufacturing a recording medium, according to an embodiment. The media stack described herein can be fabricated, for example, by a sputtering process using a sputtering system.

At block 302, an underlayer is formed over a substrate. For example, underlayer 208 (FIG. 2) is formed over substrate 202 (FIG. 2). As noted in reference to FIG. 2, an adhesion layer 204 and heat sink layer 206 may also be fabricated on substrate 202 before forming the underlayer 208.

At block 304, the underlayer is smoothed by etching the underlayer, thereby forming a smoothed underlayer. For example and according to an embodiment, underlayer 208 (FIG. 2) is physically etched to smooth the underlayer 208. According to an embodiment, underlayer 208 is physically etched by plasma etching. Plasma etching involves a stream of plasma of an appropriate gas mixture being shot at a target. For an example, the etching tool may provide ionized gaseous species with an energy of 100-300 eV. These ionized species with a kinetic energy hit the disk surface and take away the asperities on the surface, thereby reducing the surface roughness. Metallic filament is used, which emits electrons by thermionic emission, and an inert gas such as Ar is used to produce ionic species. Other reactive gases may also be utilized as etchants depending upon the material of the underlayer 208 to be etched. Furthermore, disk bias, emission current, and duration can be controlled to achieve the desirable level of etching, based on the process requirement.

Generally, surface roughness is an attribute of surface texture. Surface roughness can be measured using, for non-limiting examples, AFM (atomic force microscopy) as well as contact (e.g., a stylus) procedures. There are multiple roughness parameters that can be used, but $R_a$ is a commonly used roughness parameter, which is based on a profile or line (e.g., a mean plane) rather than on a surface or area. A value for $R_a$ represents or characterizes the arithmetic average of the roughness profile. Calculation of $R_a$ may be based on the following equation, where amplitude parameters characterize the surface based on the vertical deviations of the roughness profile from the can plane, and assuming that the roughness profile has been filtered from the raw profile data and the mean plane has been calculated, and where the roughness profile contains $n$ ordered, equally spaced points along the trace, and $y_i$ is the vertical distance from the mean plane to the $i^{th}$ data point.

$$R_a = \frac{1}{n}\sum_{i=1}^{n}|y_i| \qquad (1)$$

Another parameter that may be used to represent or characterize the roughness of a surface is $R_p$, the maximum profile peak height. Calculation of $R_p$ may be based on the following equation.

$$R_p = \max_i y_i \qquad (2)$$

According to an embodiment, smoothing the underlayer at block 304 reduces the average surface roughness ($R_a$) of the underlayer by at least about 0.4 angstrom. In the context of the maximum profile peak height, $R_p$, and according to an embodiment, smoothing the underlayer at block 304 reduces the profile peak height ($R_p$) of the underlayer surface asperities by at least about 5 angstrom. The foregoing surface roughness reductions are found to be achievable using a plasma etching process. Preferably, smoothing the underlayer at block 304 reduces the average surface roughness ($R_a$) of the underlayer to approximately equal to the average surface roughness ($R_a$) of the substrate 202 (FIG. 2).

As mentioned, a technique that may be used for measuring surface roughtness is referred to as atomic force microscopy (AFM), which is a form of very high-resolution scanning probe microscopy. One form of AFM consists of a cantilever with a sharp tip (probe) at its end that is used to scan the specimen surface to measure roughness. The cantilever is typically silicon or silicon nitride with a tip radius of curvature on the order of nanometers. When the tip is brought into proximity of a sample surface, forces between the tip and the sample lead to a deflection of the cantilever. Typically, the deflection is measured using a laser spot reflected from the top surface of the cantilever into an array of photodiodes. Thus, AFM is a useful tool for measuring the surface roughness of a thin film layer (e.g., underlayer 208 and magnetic recording layer 210 of FIG. 2) and, therefore, of a media stack. According to an embodiment, an AFM technique is employed to measure the surface roughness of underlayer 208, as AFM is considered repeatable and precise enough to accurately determine film's surface roughness characteristics.

At block 306, a magnetic recording layer is formed over the smoothed underlayer, where the magnetic recording layer is more columnar than would otherwise grow on an un-smoothed underlayer. For example, magnetic recording layer 210 is formed over the smoothed underlayer 208, whereby the crystallographic structures in the magnetic recording layer 210 that grows over the smoothed underlayer 208 is determinably more columnar in form than would be a magnetic recording layer that is grown on an underlayer without smoothing, i.e., an underlayer that was not etched as at block 304. Furthermore, a smoother medium also demonstrates enhanced flyability at relatively low fly heights, at least in part based on the removal of surface asperities from the medium.

Figure 4A:
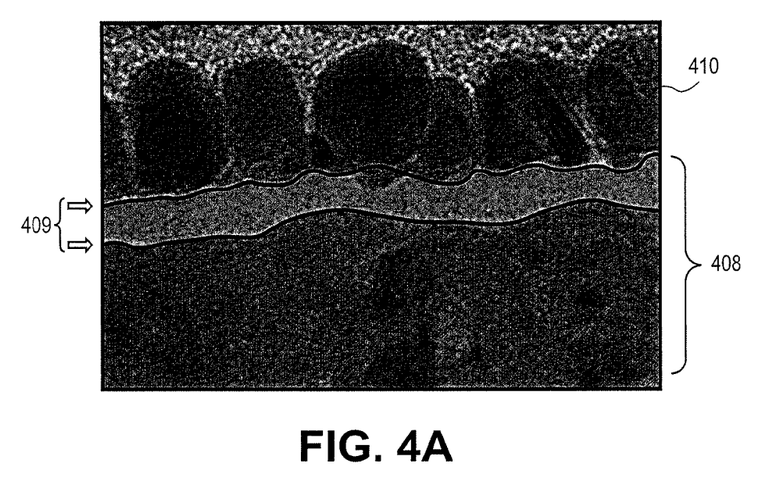
FIG. 4A and FIG. 4B are cross-sectional images showing an underlayer and a magnetic recording layer of a magnetic recording media, according to an embodiment.
Figure 4B:
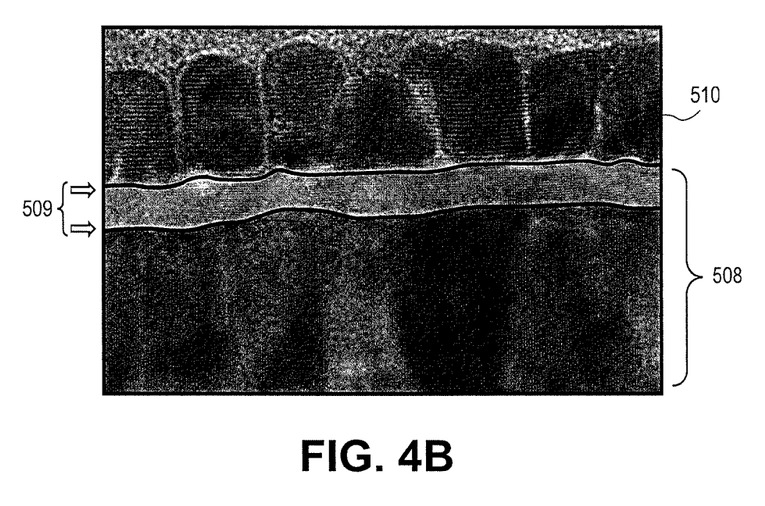

FIG. 4A and FIG. 4B are cross-sectional images showing an underlayer and a magnetic recording layer of a magnetic recording media, according to an embodiment.

FIG. 4A is a TEM (transmission electron microscopy) cross-sectional image of a sample without using an etched underlayer. The sample of FIG. 4A comprises underlayers 408 underneath a magnetic recording layer 410, such as a FePt recording layer. Magnetic recording layer 410 comprises a plurality of magnetic grains. Note the general roughness of the underlayers 408 and the general verticalness of the crystallographic structure of the magnetic grains of magnetic recording layer 410, as the characteristics are be compared with another sample image shown in FIG. 4B.

FIG. 4B is a TEM (transmission electron microscopy) cross-sectional image of a sample having an etched smoothened underlayer. The sample of FIG. 4B comprises underlayers 508 underneath a magnetic recording layer 510, such as a FePt recording layer. Note that, while not completely planar at this microscopic resolution, the roughness of the etched smoothened underlayer 508 (i.e., the emphasized layer transitions as referenced by block arrows 509) are visually smoother than the un-etched un-smoothened underlayer 408 of FIG. 4A (i.e., the emphasized layer transitions as referenced by block arrows 409). Magnetic recording layer 510 comprises a plurality of magnetic grains. Note that the magnetic grains of magnetic recording layer 510, grown on an etched smoothened underlayer 508, are more vertical than the magnetic grains of magnetic recording layer 410, grown on an un-etched, relatively rough underlayer 408.

According to an embodiment, and with reference to block 306 of FIG. 3, the components of the magnetic recording layer formed over the smoothened underlayer are more vertical, or columnar, than would otherwise grow on an un-smoothened underlayer. This is because the surface smoothening affects the magnetic recording layer growth, and is visible by comparing the image of FIG. 4A with the image of FIG. 4B. According to an embodiment, smoothing the underlayer at block 304 (FIG. 3) reduces the vertical-axis dispersion (also referred to in the art as C-axis dispersion) by at least about 0.7 degrees, as determined for FePt(002) peak by FWHM (full width at half maximum) of the rocking curve using X-ray diffraction (XRD). However, research has shown that over-etching may reverse the reduction in C-axis dispersion to some amount and thus a certain etching duration is likely to produce the minimum or optimum C-axis dispersion.

Furthermore, research has shown that to some degree the average surface roughness ($R_a$) decreases with etching time. However, the average surface roughness to etching time relation is not necessarily linear and is likely asymptotic to some surface roughness limit. Still further, the recording performance of samples etched with the described process has shown SNR (signal-to-noise ratio) improvement. For a non-limiting example, samples such as those shown in FIGS. 4A, 4B have demonstrated an SNR increase of about 0.4 dB with an etched smoothened underlayer as compared to an un-etched rough underlayer.

Embodiments described herein may be directed to a HAMR media design utilizing an etched smoothened underlayer for improved SNR and head-disk interface (HDI), for example. However, embodiments are not limited to HAMR technology only, as embodiments may be implemented in and provide benefits to other types of magnetic recording media.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A heat-assisted magnetic recording (HAMR) medium comprising:
    a substrate;
    a heat sink layer over said substrate, wherein said heat sink layer has a thickness such that a high thermal gradient is achieved in said HAMR medium;
    an etched underlayer over said heat sink layer, wherein said etched underlayer comprises an etched, smoothed surface; and
    a magnetic recording layer over said underlayer.

2. The HAMR medium of claim 1, wherein said etched underlayer is a physically-etched underlayer.

3. The HAMR medium of claim 2, wherein said physically-etched underlayer is a plasma-etched underlayer.

4. The HAMR medium of claim 1, wherein said etched underlayer provides a substantially smooth etched surface on which a more columnar FePt magnetic recording layer is grown than would otherwise grow on an un-etched underlayer.

5. The HAMR medium of claim 1, wherein an average surface roughness ($R_a$) of said etched underlayer is reduced, by etching, by at least about 0.4 angstrom.

6. The HAMR medium of claim 5, wherein said average surface roughness ($R_a$) of said etched underlayer is reduced by a particular amount as measured using atomic force microscopy.

7. The HAMR medium of claim 1, wherein an average surface roughness ($R_a$) of said etched underlayer is approximately equal to an average surface roughness of said substrate.

8. The HAMR medium of claim 1, wherein a maximum profile peak height ($R_p$) of surface asperities of said etched underlayer is reduced, by etching, by at least about 5 angstrom.

9. The HAMR medium of claim 1, wherein a vertical-axis dispersion of said magnetic recording layer is reduced, by etching said underlayer, by at least about 0.7 degrees.

10. A data storage device comprising:
- a heat-assisted magnetic recording (HAMR) disk medium rotatably mounted on a spindle, said HAMR disk medium comprising:
  - a substrate,
  - a heat sink layer over said substrate, wherein said heat sink layer has a thickness such that a high thermal gradient is achieved in said HAMR disk medium,
  - an etched underlayer over said heat sink layer, wherein said etched underlayer comprises an etched, smoothed surface, and
  - a magnetic recording layer over said etched underlayer;
- a heat-assisted magnetic recording (HAMR) head slider comprising a magnetic write head configured to write to said HAMR disk medium;
- a heat source coupled with said slider; and
- a voice coil motor actuator configured to move said HAMR head slider to access portions of said HAMR disk medium.

11. The data storage device of claim 10, wherein said etched underlayer of said HAMR disk medium is a physically-etched underlayer.

12. The data storage device of claim 10, wherein said etched underlayer of said HAMR disk medium provides a substantially smooth etched surface on which a more columnar FePt magnetic recording layer is grown than would otherwise grow on an un-etched underlayer.

13. The data storage device of claim 10, wherein an average surface roughness ($R_a$) of said etched underlayer of said HAMR disk medium is reduced, by etching, by at least about 0.4 angstrom.

14. The data storage device of claim 10, wherein an average surface roughness ($R_a$) of said etched underlayer of said HAMR disk medium is approximately equal to an average surface roughness of said substrate of said HAMR disk medium.

15. The data storage device of claim 10, wherein a maximum profile peak height ($R_p$) of surface asperities of said etched underlayer of said HAMR disk medium is reduced, by etching, by at least about 5 angstrom.

16. The data storage device of claim 10, wherein a vertical-axis dispersion of said magnetic recording layer of said HAMR disk medium is reduced, by etching said underlayer of said HAMR disk medium, by at least about 0.7 degrees.

17. A method of manufacturing a heat-assisted magnetic recording medium, the method comprising:
- forming a heat sink layer over a substrate;
- forming an underlayer over said heat sink layer;
- smoothing said underlayer by etching said underlayer to form a smoothed underlayer; and
- forming a magnetic recording layer over said smoothed underlayer, wherein said magnetic recording layer is more columnar than would otherwise grow on an un-smoothed underlayer, and wherein forming said magnetic recording layer over said smoothed underlayer reduces a vertical-axis dispersion of said magnetic recording layer by at least about 0.7 degrees compared to a magnetic recording layer that would otherwise grow on said un-smoothed underlayer.

18. The method of claim 17, wherein smoothing said underlayer includes reducing the average surface roughness ($R_a$) of said underlayer by at least about 0.4 angstrom.

19. The method of claim 17, wherein smoothing said underlayer includes reducing an average surface roughness ($R_a$) of said underlayer to approximately equal to an average surface roughness of said substrate.

20. The method of claim 17, wherein smoothing said underlayer includes reducing a maximum profile peak height ($R_p$) of said underlayer surface asperities by at least about 5 angstrom.

21. The method of claim 17, wherein smoothing said underlayer reduces an average surface roughness ($R_a$) of said underlayer and reduces a maximum profile peak height ($R_p$) of said underlayer surface asperities by a particular amount as measured by atomic force microscopy (AFM).

22. The HAMR medium of claim 1, wherein said heat sink layer comprises at least one from a group consisting of tungsten (W), ruthenium (Ru), and copper (Cu).

* * * * *